3,301,838
METHOD OF POLYMERIZATION USING A CATALYST OF TRIVALENT MANGANESE AND AN ORGANIC REDUCING AGENT

El-Ahmadi I. Heiba, 700 Avondale Ave., Haddonfield, N.J. 08033
No Drawing. Filed Aug. 20, 1963, Ser. No. 303,419
13 Claims. (Cl. 260—88.7)

This invention relates to a method for polymerizing olefinic monomers in the presence of a reducing agent, and more particularly to modifying cellulose by grafting noncellulosic polymers to it.

It is known that a polymeric material can be grafted to a cellulosic substrate by placing the cellulose in contact with a monomer or a solution of the monomer in the presence of certain chemicals. Such chemicals are generally oxidizing agents which are capable of reacting with the cellulose in such a way that a single electron is transferred for each molecular unit of oxidant. The cellulose free radical which results is then available for reaction with an olefinic monomer, thereby leading to the formation of a polymer chain which is grafted to the cellulose. In addition to cellulose, which may be considered to be a polymeric reducing agent, monomeric reducing agents, particularly ketones and aldehydes, may be used in this method.

The prior art teaches how a monomer having the general formula $CH_2=C<$ (vinyl or vinylidene) in an aqueous medium, may be polymerized and grafted to an organic reducing agent in the presence of either a ceric salt or a cobaltic salt. The reducing agents may be chosen from a wide variety of monomeric or polymeric materials. It has been found, however, that when this process is applied to the grafting of polymers to cellulose that the cellulose has a tendency to become yellowed. This, of course, is objectionable in the case of cotton cloth where extreme whiteness of the treated cloth is considered essential. Moreover, the use of the ceric salt (a salt of a rare earth) or the use of the cobaltic salt (a salt of a metal of Group VIII of the Periodic Table) introduces some problems in polymerization rate control. That is, it is sometimes not possible to carry out the polymerization at a sufficiently slow rate to achieve exact control. Moreover, ceric and cobaltic salts are relatively expensive.

The grafting of certain polymers to cellulose offers the possibility of modifying cellulosic materials to enhance their physical and chemical properties without detracting from the properties inherent in cellulose. Thus, it is possible by selection of a suitable olefinic compound, to improve the resistance of cellulose to degradation, to enhance its resiliency, and to modify its water sensitivity without materially affecting its strength, hand and other properties associated with cellulose.

It is therefore an object of this invention to provide a method of modifying the physical and chemical characteristics of cellulosic materials without detracting substantially from their inherent properties.

It is another object to provide a method of the character described which, by selection of suitable olefinic compounds, is capable of improving the resiliency, strength and resistance to degradation of cellulosic materials and of modifying their water sensitivity.

It is yet another object of this invention to provide such a method which accomplishes the above desiderata without adverse effects on the color and appearance of the articles made from the so-treated cellulosic materials.

It is a further object to provide a method of the character described which is particularly useful for the modification of cellulose and which is capable of being carried out with accurate control.

Another object is to provide a method of polymerizing certain monomers having the group $H_2C=C<$.

Other objects of the invention will in part be obvious and will in part be apparent hereinafter.

These and other objects are accomplished in accordance with the method of this invention which comprises polymerizing a polymerizable compound containing the $CH_2=C<$ group in a reaction medium containing (1) trivalent manganese, preferably an ion in the form of a salt of an inorganic acid, the salt being soluble in at least one component of the reaction medium, and (2) an essentially non-ionizable organic reducing agent. It is believed that the reducing agent is oxidized by the trivalent manganese, and thereby initiates the polymerization and chemical attachment of the polymerizable compound to the reducing agent. The reaction medium is most conveniently aqueous and is preferably maintained at a pH below about 3.5 during the resulting reaction. The reducing agent is preferably selected from the group consisting of cellulose, ketones and aldehydes, although mercaptans, alcohols, acetals and the like may be utilized as desired.

When cellulose serves as the reducing agent, the resulting treated cellulose, depending on the polymerizable component utilized, may have high resiliency, modified sensitivity to water, and, depending on the degree of reaction, may retain substantially all of its cellulosic properties while being modified as indicated. In the specific case of cotton fabrics the treated fabrics exhibit no discoloration as a result of the reaction. The amount of homopolymer (that polymer which is not chemically attached, or grafted, to the cellulose) is, moreover, maintained at optimum levels.

When ketones and aldehydes are used as the reducing agent, the percent of polymerizable compound converted to polymer is materially increased over that which takes place when these reducing agents are not present.

While the mechanism by which the polymerizable compounds are chemically attached to the reducing agent is not fully known, it is believed that the trivalent manganese reacts with the reducing agent to form sites thereon at which the polymerizable compound reacts and polymerizes to form the desired chemical attaching or grafting. Assuming this to be true, the reducing agent can be defined as one which is an essentially non-ionizable organic material capable of being oxidized by the trivalent manganese ion in an aqueous medium and of initiating polymerization of the olefinic monomers defined above.

The polymerizable compounds used in this method are preferably in monomeric form.

A preferred class of monomers includes those represented by the formula:

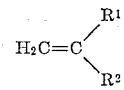

wherein $R^1$ is hydrogen, an alkyl group (preferably containing 1 to 8 carbon atoms) or halogen and $R^2$ is COOH, CONR$^1$R$^1$, CN, a halogen or an ester grouping COOR$^3$, where $R^3$ is an alkyl group preferably containing 1 to 8 carbon atoms. Among the monomers which fall within this group are the monomeric acrylic acids and the monomeric derivatives of acrylic and substituted acrylic acids, such as their amides, nitriles, esters and halides; the vinyl halides and acetates; and the vinylidenes. The acrylic amides, nitriles and esters are particularly suited to this method of polymerization. The esters of the acrylic acids are those of the monohydric aliphatic alcohols including methyl, ethyl, n-propyl, n-butyl, n-hexyl, n-octyl, n-nonyl, n-decyl, n-dodecyl, n-tetradecyl and n-hexadecyl.

The method of this invention is applicable to any known form of cellulose. Preferably, the cellulose is substantially free from phenolic-lignin type components which occur naturally with the cellulose. Such materials have been found to inhibit polymerization. Included in the forms of cellulose which may be treated in accordance with this invention are cotton in its various forms, wood pulp, paper, synthetic cellulose products, such as regenerated cellulose including rayons, cellulose esters, including cellulose acetates, propionates and the like. The term "cellulose" is also used to include all mixtures of these natural or synthetic fibers with synthetic filaments such as the nylons, polyesters, acrylonitrile polymers and the like, wherein the mixture contains at least a major amount of cellulose. The cellulose or mixture may be treated in any desired form, e.g., fibers, yarn knitted, woven or nonwoven.

The monomeric ketones which may be used include, but are not limited to, acetone, methylethyl ketone, diethyl ketone, ethylpropyl ketone, etc. Among the monomeric aldehydes which may be used are included acetaldehyde, propionaldehyde, etc.

The trivalent manganese ion catalyst may be prepared by procedures well known in the art. For example, the procedure described by Lingane and Karplus in Industrial and Engineering Chemistry, Analytical Ed., 18, 191, 1946, is suitable for the preparation of this catalyst. The trivalent manganese ion may be in the form of a complex polyvalent salt of one of the strong mineral acids such as nitric, sulfuric, phosphoric or hydrochloric, and it may be complexed with an alkaline metal ion such as ammonium or sodium. The trivalent manganese ion is provided in a form which is capable of oxidizing cellulose or other reducing agent while at the same time being relatively non-reactive with the vinyl monomer under the reaction conditions used. Under the conditions which it is employed it is also capable of undergoing a valence change to be reduced itself to the manganous form.

In the process of this invention, the polymerization preferably is conducted in an aqueous medium, e.g., solution, dispersion or emulsion, although organic solvent systems are feasible for water insoluble polymerizable compounds. A small amount of water is preferably added to the organic solvent system to enhance the polymerization. The trivalent manganese catalyst, such as in a polyvalent salt containing the trivalent manganese ion, may be dissolved in the aqueous medium and diluted, if necessary, to the desired concentration. Suitable concentrations include $10^{-6}$ to $10^{-1}$, preferably $10^{-3}$ to $10^{-2}$, mole per mole of polymerizable compound. The pH of this system is preferably adjusted between about 0.5 and about 3.5, most preferably between about 1 and about 2. This adjustment is conveniently effected by the addition of an acid such as sulfuric, hydrochloric and the like. The polymerizable compound, preferably in monomer form, may then be introduced into the aqueous system in preparation for reaction with the desired reducing agent.

The quantity of monomer utilized is determined by the amount of polymer to be attached or grafted, to the reducing agent. For example, where a polymer is to be grafted onto a cellulosic fabric it is usually desirable to introduce about 10 to 1000% of the fabric weight into it as a polymer. This in turn requires the introduction of from about 10 to greater than about 1000%, by cellulose weight, as monomer. An alternative way of determining the amount of monomer and reducing agent is to base the amount of reducing agent upon the amount of monomer used. This ratio of reducing agent to monomer may be widely varied depending upon the desired properties sought in the finished product. As a consequence large excesses of either component may be used and the reducing agent may vary as much as from about 0.1% to about 1000% by weight of the monomer.

The reducing agent is preferably contacted by an aqueous system containing both the oxidizing agent and the monomer, although separate treatments may be utilized if desired. Cellulosic materials are conveniently contacted by the aqueous system until the desired degree of polymerization grafting has taken place.

After completion of the graft polymerization to the cellulose, it is removed from the aqueous reaction system washed free of any loosely adhering polymer with a suitable solvent, rinsed and dried. Solvent washing may be unnecessary for many end uses, particularly in view of the small amounts of unattached homopolymer produced during the process of this invention. Drying may be carried out at room temperature, in a warm air oven, or by any other suitable techniques which employ temperatures normally used for removing moisture from cellulose.

When the reducing agent is not in the form of fabric, yarn, or the like, but is in liquid form, the reaction may be conducted by adding the reducing agent liquid to an aqueous reaction liquid containing the oxidant and monomer. The mixture is stirred, preferably while an inert atmosphere is maintained about it. Polymerization is indicated by the formation of insoluble polymer. When polymerization is completed to the desired degree, the resulting polymer may be isolated by filtration or equivalent procedure, washed and then dried to remove residual moisture, or other solvent if a nonaqueous system is utilized. The resulting polymer then may be granulated to powder form and used as other thermoplastic resins, e.g., in molding, film forming, etc.

The reaction to graft the polymer to the reducing agent may be carried out at temperatures between about $-20°$ and about $100°$ C., preferably between about $-10°$ and about $30°$ C. No adjustment in pressure is required, although adjustments may be made as desired. It is, however, preferable to carry out the reaction in an essentially nonoxidizing atmosphere and this is conveniently done by flushing the apparatus with an inert gas, such as nitrogen.

In general, the time required may be determined experimentally for each monomer, reducing agent and oxidizing agent combination and for the operational conditions utilized in the process. The extent of polymerization may be determined by any suitable technique such as by gravimetric analysis. The reaction may be terminated either by the addition of reducing materials such as sodium bisulfite which will exhaust the trivalent manganese ions or by raising the pH substantially above 3.5, e.g., up to about 7 or higher.

The following examples illustrate specific embodiments of this invention.

*Examples 1–23*

A .005 molar solution of sodium manganese pyrophosphate was prepared according to the procedure of Lingane and Karplus (Ind. Eng. Chem., Anal. Ed., 18, 191, 1946). The solution was adjusted to pH 1.0 with sulfuric acid. Ten parts by volume of this solution were diluted with 90 parts by volume of water and 5 parts of inhibitor-free acrylonitrile were added. The mixture was shaken well. A piece of cotton fabric, approximately 4 inches by 2 inches was immersed in it. A glass tube was placed in the solution, and nitrogen passed through it. The mixture was stored in this fashion at 25–30° C. for 50 minutes. The cloth was then removed, washed thoroughly and air-dried. It showed a weight pick-up of 30–35%. The cloth was perfectly white and had no trace of off-color. Moreover, it exhibited a good hand, and a greater degree of water repellancy than the untreated cotton fabric.

Using 0.0005 molar solutions of sodium manganese pyrophosphate prepared as above, a number of cellulosic materials as reducing agents and three different monomers, illustrating the use of arylic nitriles, amides and esters, were reacted as above. The results are tabulated below.

MONOMER: ACRYLONITRILE

| Example | Cellulosic Material (Reducing agent) | Reaction time | % Wt. Increase in Cellulosic Material |
| --- | --- | --- | --- |
| 1 | Cotton | 20–30 min | 35 |
| 2 | Rayon | 1½ hrs | 32 |
| 3 | Bleached kraft pulp | 19 hrs | 178 |
| 4 | Bleached sulfite | 21 hrs | 76 |
| 5 | Grey cotton | 45 min | 6 |
| 6 | Scoured grey cotton | 50 min | 10 |
| 7 | Filter paper | 20 min | 20 |
| 8 | Kraft paper | 1 hr | 1 |

MONOMER: ACRYLAMIDE

| Example | Cellulosic Material | Reaction time | % Wt. Increase |
| --- | --- | --- | --- |
| 9 | Cotton | 17 hrs | 20 |
| 10 | Rayon | 19 hrs | 31 |
| 11 | Bleached sulfite | 19 hrs | 33 |
| 12 | Grey cotton | 18 hrs | 48 |
| 13 | Scoured grey cotton | 18 hrs | 26 |
| 14 | Filter paper | 18 hrs | 10 |
| 15 | Kraft paper | 18 hrs | 1 |

MONOMER: ETHYL ACRYLATE

| Example | Cellulosic Material | Reaction time | % Wt. Increase |
| --- | --- | --- | --- |
| 16 | Cotton | 5 hrs | 150 |
| 17 | Rayon | 1½ hrs | 103 |
| 18 | Bleached kraft pulp | 7 hrs | 798 |
| 19 | Bleached sulfite | 7 hrs | 797 |
| 20 | Grey cotton | 1 hr | 59 |
| 21 | Scoured grey cotton | 15 min | 46 |
| 22 | Filter paper | 4 hrs | 224 |
| 23 | Kraft paper | 30 min | 2 |

These examples illustrate the wide variety of cellulosic materials which may be used in this method of treatment. Moreover, these data illustrate preferred monomers and the wide variations in monomer concentrations and in amount of polymer formation which are possible. Because the trivalent manganese ion is relatively slow in the promotion of the reaction of this invention, it is possible to achieve relatively good control over the reaction rate. Additional control is of course available through the use of lower reaction temperatures. Finally, Examples 8, 15 and 23 illustrate the effect of large amounts of phenolic-lignin components in the cellulose during reaction.

The samples reacted with acrylonitrile and acrylamide exhibit increased strength and resistance to micro-biological attacks while the samples reacted with ethyl acrylate have particularly improved water repellency.

*Examples 24 and 25*

Three 5 cc. samples of acrylonitrile, freed of inhibitor by washing with one volume of 1 N hydrochloric acid for five volumes of monomer, were separately dissolved in 78 cc. quantities of water. Twenty-two cc. of a solution of $5 \times 10^{-3}$ mole of the polyvalent salt of Example 1 at a pH of 1.0 was added to each of water-monomer mixtures to prepare three different aqueous liquid reaction systems. One was retained as a control, while one cc. of a ketone and one cc. of an aldehyde were added to one of each of the remaining two systems. The solutions were flushed with nitrogen and polymerized at 25° C. The results are tabulated below.

| Example | Reducing Agent | Reaction Time | Percent Monomer conversion to Polymer |
| --- | --- | --- | --- |
| Control | None | 50 min | 0.7 |
| 24 | Methylethyl ketone | 50 min | 4.5 |
| 25 | Propionaldehyde | 50 min | 18.0 |

The polymers prepared according to the teaching described herein have utility in those applications in which comparable polymers are presently used, as for example in molding, laminaitng, and textile and paper finishing.

What is claimed is:
1. A method for forming a polymer comprising polymerizing an ethylenically unsaturated polymerizable compound having the formula:

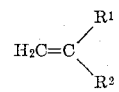

wherein $R^1$ is selected from the group consisting of hydrogen, alkyl and halogen and $R^2$ is selected from the group consisting of COOH, CONR$^1$R$^1$, CN, halogen and COOR$^3$, wherein $R^3$ is alkyl, in the presence of:
 (1) from about $10^{-6}$ to $10^{-1}$ mole of trivalent manganese per mole of polymerizable compound, the trivalent manganese being soluble in at least one component of the reaction medium, and
 (2) an organic reducing agent selected from the group consisting of aldehydes, ketones, mercaptans, alcohols and acetals.
2. The method of claim 1 wherein the polymerization is conducted in an aqueous medium.
3. The method of claim 2 wherein the pH of said aqueous medium is maintained below about 3.5 during the polymerization.
4. The method of claim 3 wherein the travalent manganese is in the form of an ion derived from a polyvalent salt containing said ion, said salt being soluble in at least one component of a reaction medium containing the polymerizable compound and the organic reducing agent.
5. The method of claim 1 wherein the organic reducing agent is selected from the group consisting of aldehydes and ketones.
6. The method of claim 5 wherein the organic reducing agent comprises an aldehyde.
7. The method of claim 5 wherein the organic reducing agent comprises a ketone.
8. A method for forming a polymer comprising polymerizing a polymerizable monomer having the formula

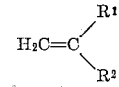

whereing $R^1$ is selected from the group consisting of hydrogen, alkyl, and halogen and $R^2$ is selected from the group consisting of COOH, CONR$^1$R$^1$, CN, halogen and COOR$^3$ wherein $R^3$ is an alkyl group; said polymerization being carried out in an aqueous medium at a pH not greater than 3.5 in the presence of (1) from about $10^{-6}$ to $10^{-1}$ mole of trivalent manganese per mole of polymerizable compound, the trivalent manganese being soluble in at least one component of the reaction medium, and (2) and organic reducing agent being selected from the group consisting of aldehydes and ketones.
9. A method in accordance with claim 8 wherein said monomer is acrylonitrile.
10. A method in accordance with claim 8 wherein said monomer is acrylamide.
11. A method in accordance with claim 8 wherein said monomer is an ester of acrylic acid.
12. A method in accordance with claim 8 wherein said aldehyde is propionaldehyde.

13. A method in accordance with claim 8 wherein said ketone is methylethyl ketone.

References Cited by the Examiner

UNITED STATES PATENTS

| | | | |
|---|---|---|---|
| 2,614,101 | 10/1952 | Uraneck et al. | 260—89.5 |
| 3,032,518 | 5/1962 | Segro | 260—17.4 |
| 3,088,939 | 5/1963 | Miller | 260—88.7 |
| 3,095,391 | 6/1963 | Brockway et al. | 260—17.4 |
| 3,098,060 | 7/1963 | Miller | 260—88.7 |

FOREIGN PATENTS 1,327,480    4/1963    France.

OTHER REFERENCES

Minoura et al.: Chem. Abs. 59 (1963), p. 8899d (an abstract of Japanese Patent No. 17,489, October 1962.

DONALD E. CZAJA, *Primary Examiner.*

JOSEPH L. SCHOFER, HARRY WONG,

*Assistant Examiners.*